United States Patent
Kaufmann et al.

(10) Patent No.: US 10,151,657 B2
(45) Date of Patent: Dec. 11, 2018

(54) DIAPHRAGM PRESSURE GAUGE WITH MONITORING FUNCTION

(71) Applicant: WIKA Alexander Wiegand SE & Co. KG, Klingenberg/Main (DE)

(72) Inventors: Reimund Kaufmann, Erlenbach (DE); Andreas Massong, Roellbach (DE); Karsten Mottl, Erlenbach (DE)

(73) Assignee: WIKA Alexander Wiegand SE & Co. KG, Klingenberg/Main (DE)

( * ) Notice: Subject to any disclaimer, the term of this patent is extended or adjusted under 35 U.S.C. 154(b) by 176 days.

(21) Appl. No.: 15/164,921

(22) Filed: May 26, 2016

(65) Prior Publication Data

US 2016/0349128 A1     Dec. 1, 2016

(30) Foreign Application Priority Data

May 26, 2015    (DE) .......................... 10 2015 006 524

(51) Int. Cl.
| | |
|---|---|
| *G01L 7/08* | (2006.01) |
| *G01L 7/06* | (2006.01) |
| *G01L 19/16* | (2006.01) |

(52) U.S. Cl.
CPC .............. *G01L 7/084* (2013.01); *G01L 7/063* (2013.01); *G01L 19/16* (2013.01)

(58) Field of Classification Search
None
See application file for complete search history.

(56) References Cited

U.S. PATENT DOCUMENTS

| | | | | |
|---|---|---|---|---|
| 3,894,435 | A * | 7/1975 | Shimada ................... | F02D 3/00 338/4 |
| 4,166,396 | A * | 9/1979 | Baker ...................... | G01L 7/084 73/706 |
| 4,217,784 | A * | 8/1980 | Neubeck .................. | G01L 7/041 73/732 |
| 4,572,000 | A * | 2/1986 | Kooiman .............. | G01L 13/025 361/283.4 |
| 9,683,908 | B2 * | 6/2017 | Ferran ................... | G01L 9/0072 |

* cited by examiner

*Primary Examiner* — John Fitzgerald
*Assistant Examiner* — Jean Morello
(74) *Attorney, Agent, or Firm* — Muncy, Geissler, Olds & Lowe, P.C.

(57) ABSTRACT

A diaphragm pressure gauge, in which a measuring spring is monitored in regard to integrity in that on the side, facing away from the process pressure, of the measuring spring a vacuum chamber is formed to which vacuum is applied and which is controlled by means of a vacuum monitoring device to maintain the vacuum.

13 Claims, 4 Drawing Sheets

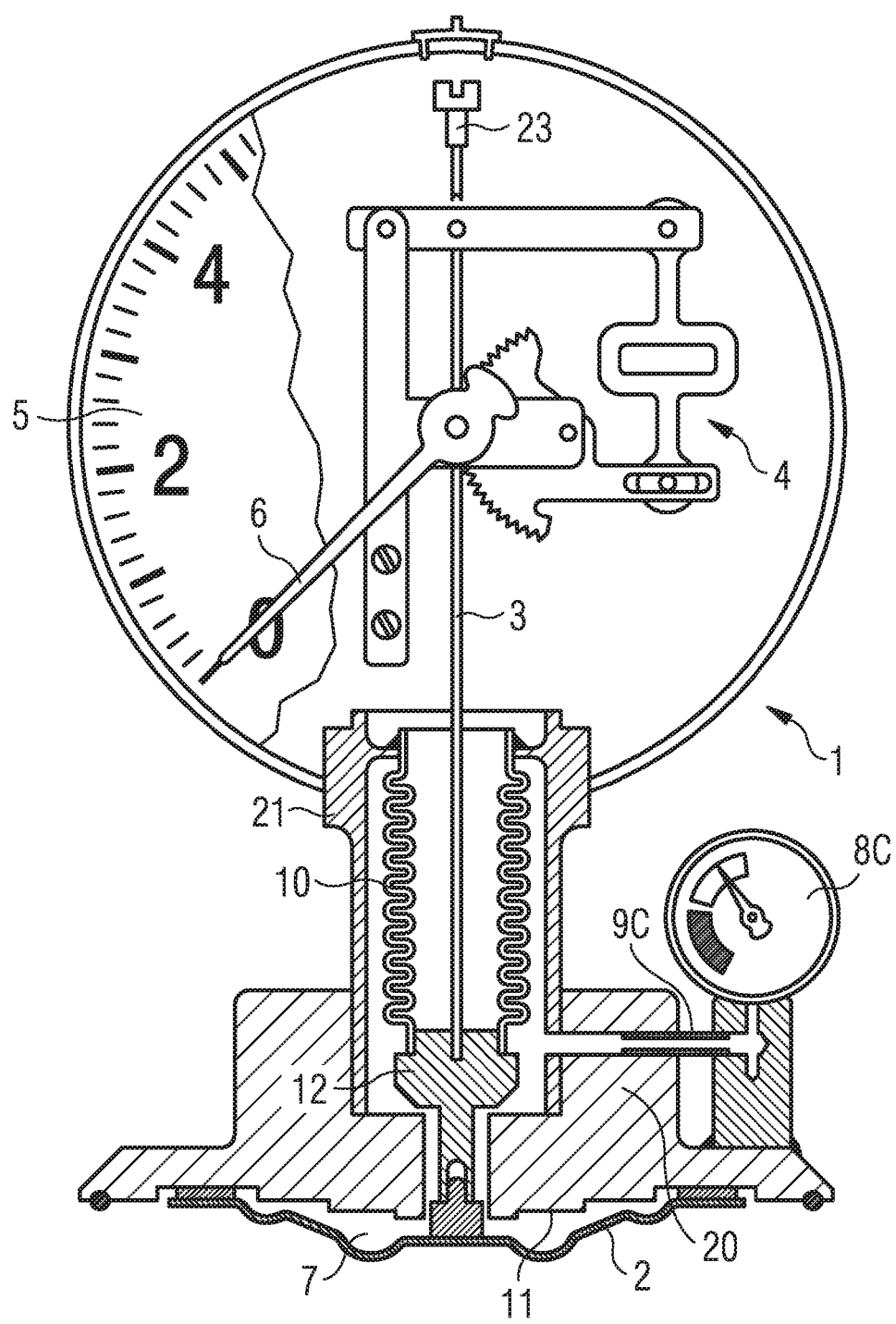

DIAPHRAGM PRESSURE GAUGE WITH MONITORING FUNCTION

This nonprovisional application claims priority under 35 U.S.C. § 119(a) to German Patent Application No. 10 2015 006 524.6, which was filed in Germany on May 26, 2015, and which is herein incorporated by reference.

BACKGROUND OF THE INVENTION

Field of the Invention

The invention relates to a pressure sensing and measuring system in the form of a diaphragm pressure gauge with monitoring of the process-side diaphragm.

Description of the Background Art

Diaphragm pressure gauges are convenient, robust, and highly accurate pressure-indicating instruments, which can display a pressure without auxiliary energy and pressure transfer fluids.

SUMMARY OF THE INVENTION

It is therefore an object of the invention to provide a cost-effective solution for monitoring leakage in the plate diaphragm or measuring membrane of a diaphragm pressure gauge. Moreover, a structure is to be created which enables the rapid visual readability of a leak.

According to an exemplary embodiment of the invention, the diaphragm pressure gauge includes at least one plate-shaped measuring spring, a push rod coupled to the measuring spring, and a measuring mechanism, which is configured to convert a mechanical movement into a pointer deflection on a display dial, whereby the push rod transmits a movement of the measuring spring, said movement caused by an application of pressure by a process pressure, to the measuring mechanism to produce a pointer deflection. In the diaphragm pressure gauge of the invention, a fluid-tight vacuum chamber to which a vacuum can be applied is formed on the side of the measuring spring facing away from the process pressure. Further, the diaphragm pressure gauge is provided with a vacuum monitoring device, which is set up to maintain a predetermined value of the vacuum in the vacuum chamber.

According to an embodiment of the invention, the vacuum chamber has a bellows on a side, facing away from the process pressure, of the measuring spring, which bellows allows the relative movement of the push rod to the measuring mechanism of the measuring device.

According to an embodiment of the invention, the vacuum monitoring device has a separate pressure measuring device.

According to an embodiment of the invention, the vacuum monitoring device has a Bourdon pressure gauge, which has a display that is integrated preferably into the display dial of the diaphragm pressure gauge.

According to an embodiment of the invention, the vacuum monitoring device has a display, which by a coding, particularly a color coding, for example, by red/green fields, indicates the maintenance of a predetermined value of the vacuum in the vacuum chamber and/or a fluid-tight state of the measuring spring.

According to an embodiment of the invention, a pressure characteristic of the diaphragm pressure gauge is configured substantially with consideration of the characteristic of the measuring spring, of the characteristic of the bellows, and/or of the value of the vacuum in the vacuum chamber in relation to the area of the measuring spring.

According to an embodiment of the invention, on the side, facing away from the process pressure, of the measuring spring, a support arrangement with a predefined geometry is provided, which in the case of an overload or too high pressure on the side, facing the process pressure, supports the measuring spring to prevent damage.

According to an embodiment of the invention, the support arrangement on the side, facing away from the process, of the measuring spring has an arrangement with a stepped geometry and/or an arrangement adapted in shape to the measuring spring.

According to an embodiment of the invention, the chamber is formed by the measuring spring and a further membrane, which are coupled to one another by a coupling element to transmit a deflection of the measuring spring to the further membrane.

According to an embodiment of the invention, the vacuum monitoring device is provided with an emitter for emitting a signal, particularly an electrical signal when the value of the vacuum in the vacuum chamber falls below a predetermined vacuum value.

In an exemplary embodiment, pressures can be read directly on a dial and observed over the course of time.

In an embodiment, a diaphragm, defined in thickness, stamping, diameter, and material depending on the pressure, is fixed to the circumference, or soldered or welded sealingly to a flange or sealed with O-rings.

A push rod is secured to the diaphragm, for example, to the middle of the diaphragm, which transmits the pressure and the diaphragm movement to a pointer mechanism.

According to the invention, the diaphragm pressure gauge has a bellows internally, which allows the evaluable movement of the push rod, attached perpendicular to the measuring membrane, in the case of the application of or changes in pressure, but simultaneously inwardly to the measuring device seals a rear diaphragm chamber, namely, a vacuum chamber, around the process-side diaphragm, which chamber can be supplied with a vacuum.

The vacuum is monitored, for example, by a second smaller Bourdon pressure gauge, which is connected pressure-tight via a capillary line to the rear diaphragm chamber.

A pressure equalization would fill the vacuum in the event of a tear in the diaphragm or some other leakage such as, for example, in the soldering or circumferential weld seam. This would be readable simultaneously on the monitoring pressure gauge, which would then bring about a pointer deflection or some other change in the display on a smaller integrated section of the dial of the diaphragm pressure gauge.

An operator, for example, of a food and beverage process would be warned in this way and arrange for a timely replacement of the device.

Likewise, such a diaphragm pressure gauge can also be used in all other processes where a front-flush, easy-to-clean measurement surface is required.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 shows a sectional view of an exemplary embodiment.

DETAILED DESCRIPTION

Figure 1:
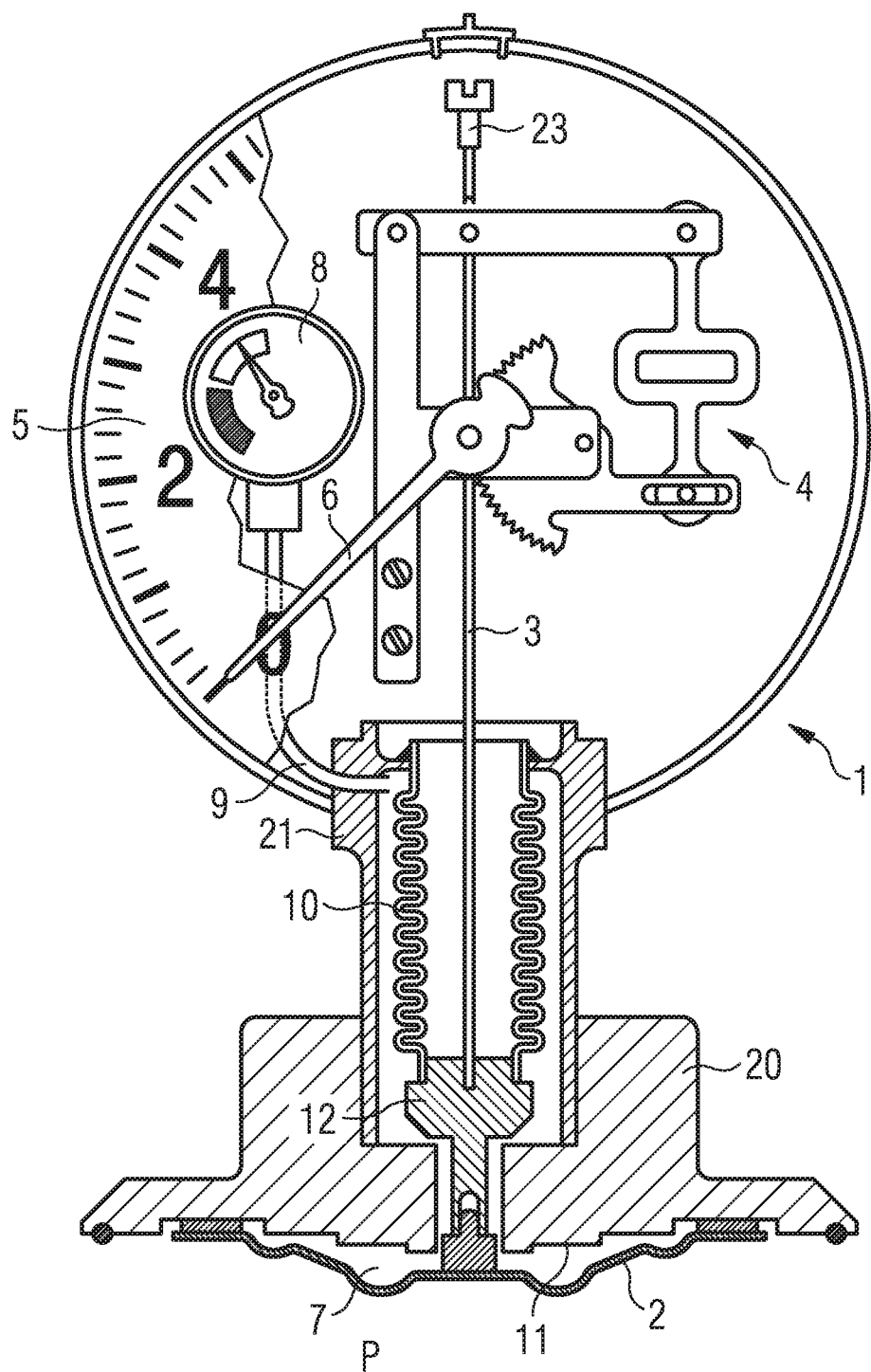
FIG. 1 shows a sectional view of an exemplary embodiment.

As shown in FIG. 1, diaphragm pressure gauge 1 is provided with a base element 20, a socket 21 attached thereto, and a measuring mechanism 4. Measuring mechanism 4 works together with a pointer 6, which in the present exemplary embodiment is configured to display a pressure on a display dial 5.

A measuring spring 2, one side of which points to a process region P whose pressure is to be measured, is provided on base element 20. Measuring spring 2 is attached pressure-tight to base element 20. In the exemplary embodiment of FIG. 1, a push rod 3 is connected to measuring spring 2, so that a deflection of measuring spring 2 is converted into a movement of push rod 3. Push rod 3 in the exemplary embodiment of FIG. 1 is surrounded by a bellows 10, whose radial inner side is open to the interior of the pressure gauge. The radial outer side of bellows 10 together with the side of measuring spring 2, facing away from process region P, defines a vacuum chamber 7. To this end, bellows 10 is connected pressure-tight at one end to socket 21 and with the other end to a coupling element 12.

The rear chamber on the side, facing away from process region P, of measuring spring 2 (here soldered in by way of example) has a support arrangement 11, which supports measuring spring 2 in the case of excess pressure and thus protects it from destruction. Push rod 3 is run through a central opening in socket 21 to measuring mechanism 4, which can cause the pointer axle to rotate via a lever mechanism and toothed segment and in this way indicate pressure changes on display dial 5 with pointer 6. Bellows 10 surrounding push rod 3 allows a relative movement of push rod 3 toward measuring mechanism 4 of the measuring device and toward connecting flange of base element 20 at vacuum chamber 7. To this end, push rod 3 can be connected optionally via a coupling element 12 to measuring spring 2.

A Bourdon pressure gauge 8, which is provided for measuring the vacuum in vacuum chamber 7 and is preferably smaller than the actual measuring device, is connected pressure-tight via a line 9, for example, a capillary line, to said vacuum chamber 7 and within display dial 5 of diaphragm pressure gauge 1 indicates the integrity of the vacuum in vacuum chamber 7 or diaphragm 2.

An adjusting screw 23, which enables the setting of the zero point of measuring mechanism 4, is provided under a cap at the top on diaphragm pressure gauge 1. Further details in this regard are not shown.

Figure 2:
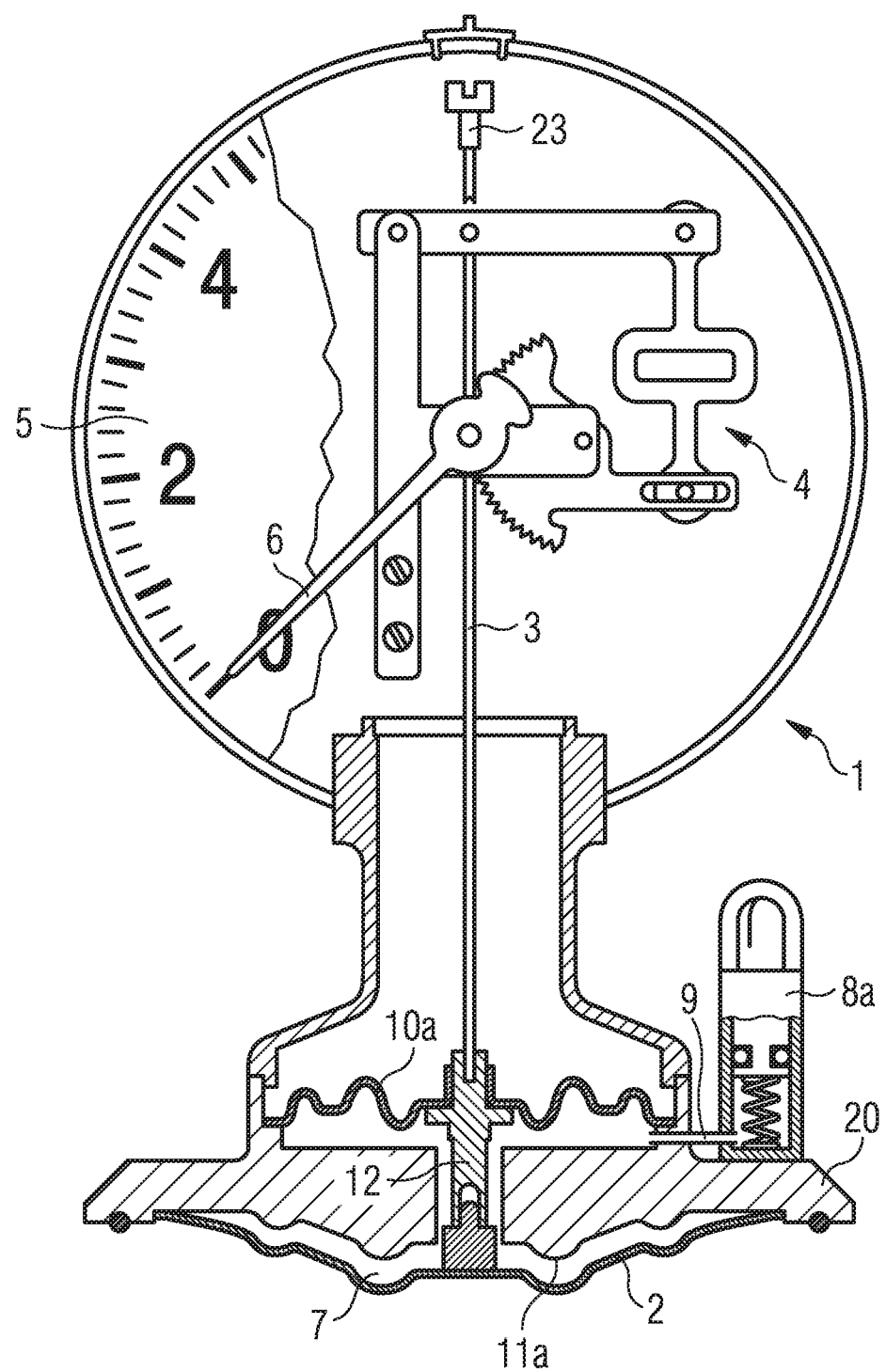
FIG. 2 shows a sectional view of an exemplary embodiment.

FIG. 2 shows a further sectional principle view of a further exemplary embodiment. Primarily differences in regard to the structure shown in FIG. 1 will be described.

It can be seen in FIG. 2 that the rear chamber, namely, vacuum chamber 7, on the side of measuring spring 2, said side facing away from process region P, is closed off by a further membrane 10a, for example, a flat membrane, from which a connection to a mechanical pressure/low pressure indicator 8a is made via a line 9 to monitor the process-side measuring spring 2 (here welded by way of example). If vacuum is lost in vacuum chamber 7, a visual alarm is possible here via a spring-loaded plunger or a change indicator via a visual display by the pressure/low pressure indicator 8a.

Figure 3:
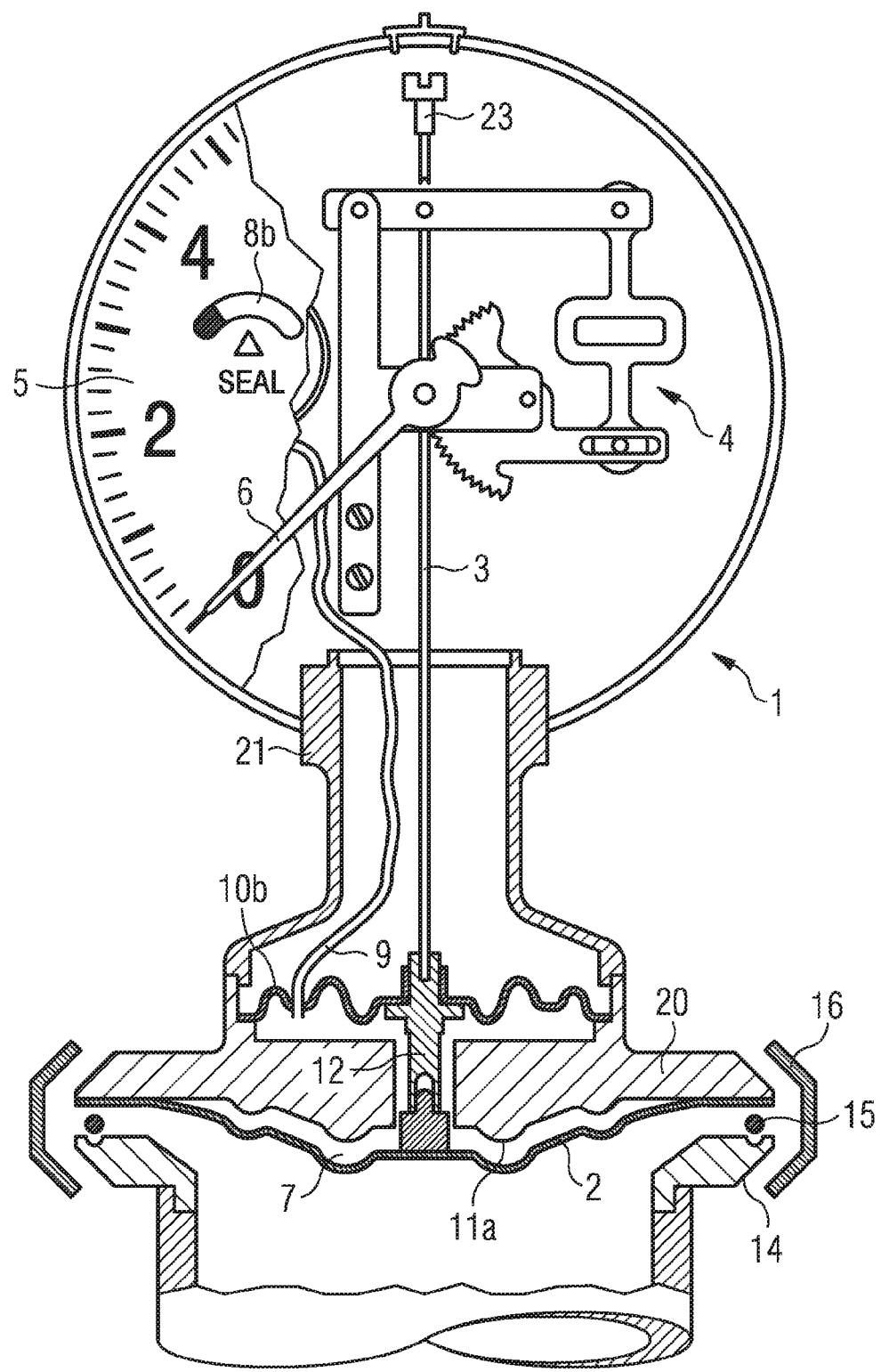
FIG. 3 shows a sectional view of an exemplary embodiment.

FIG. 3 shows a sectional principle view according to the invention of a supplementary exemplary embodiment. Primarily differences relative to the structure shown in FIG. 1 or FIG. 2 will be described.

It is evident in FIG. 3 that the rear chamber, namely, vacuum chamber 7, on the side of measuring spring 2, said side facing away from the process region P, is closed off by a further flat membrane 10b as in FIG. 2, and a line 9, for example, a capillary line, is run up to a pressure indicator 8b in the device, which, only in a section of the main dial of display dial 5, for example, rotates an indicator of the vacuum and the associated "normal/tight" function of measuring spring 2 by means of a rotating red/green dial in a cutout window.

The device in the exemplary application is attached to an "NuG" flange (=food and beverage flange) with a clamp closure 16 to a pipe connection by means of an O-ring seal 15. Other applications are possible, of course.

FIG. 4 shows a sectional principle view according to the invention of a supplementary exemplary embodiment. Primarily differences in regard to the structure shown in FIG. 3 will be described.

In this case, a Bourdon pressure gauge 8C, which is preferably smaller than the actual measuring device, is attached outside the actual measuring setup on base element 20 and is connected pressure-tight to vacuum chamber 7 via a line 9C, for example, a capillary line, and indicates the integrity of the vacuum in vacuum chamber 7, and herewith the integrity of diaphragm 2, outside display dial 5 of diaphragm pressure gauge 1.

Optionally measuring device 8C can also be made electronically as a sensor or pressure switch or installed with an extended line in a control room or display panel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diaphragm pressure gauge comprising:
   at least one plate-shaped measuring spring;
   a push rod coupled to the measuring spring;
   a measuring mechanism, which is configured to convert a mechanical movement into a pointer deflection on a display dial, wherein the push rod transmits a movement of the measuring spring, the movement caused by an application of pressure by a process pressure in a process region to the measuring mechanism to produce a pointer deflection;
   a fluid-tight vacuum chamber to which vacuum is applied is formed on a side of the measuring spring facing away from the process region;
   a vacuum monitoring device that measures and indicates a value of the vacuum in the vacuum chamber;
   a base element, wherein an outer periphery of the side of the measuring spring facing away from the process region is attached to a bottom surface of the base element;
   a socket, a lower end of the socket being at least partially inserted inside a cavity of the base element, the cavity recessed from an upper surface of the base element, and an upper end of the socket being inserted inside of a housing of the display dial;

a capillary line connecting the vacuum chamber to the vacuum monitoring device, such that the capillary line is provided inside of the socket and inside of the housing of the display dial.

2. The diaphragm pressure gauge according to claim 1, wherein the vacuum chamber on the side of the measuring spring facing away from the process region has a bellows, which allows a relative movement of the push rod to the measuring mechanism of the diaphragm pressure gauge.

3. The diaphragm pressure gauge according to claim 1, wherein the vacuum monitoring device has a separate pressure measuring device.

4. The diaphragm pressure gauge according to claim 1, wherein the vacuum monitoring device has a Bourdon pressure gauge, which has a display that is integratable into the display dial of the diaphragm pressure gauge.

5. The diaphragm pressure gauge according to claim 1, wherein, on the side of the measuring spring facing away from the process region, a support arrangement with a predefined geometry is provided, which in the case of overload or too high pressure on the side of the measuring spring facing the process region supports the measuring spring to prevent damage.

6. The diaphragm pressure gauge according to claim 1, wherein the vacuum monitoring device is provided with an emitter for emitting a signal or an electrical signal when the value of the vacuum in the vacuum chamber falls below a predetermined vacuum value.

7. The diaphragm pressure gauge according to claim 6, wherein the color coding includes red/green fields.

8. The diaphragm pressure gauge according to claim 1, wherein, the vacuum chamber extends from the side of the measuring spring facing away from the process region, through the cavity of the base element, through a central cavity of the socket and terminating in the upper end of the socket that is inserted inside of the housing of the display dial.

9. The diaphragm pressure gauge according to claim 1, wherein the vacuum monitoring device is provided inside of the housing of the display dial.

10. The diaphragm pressure gauge according to claim 1, wherein the vacuum monitoring device has a display, which by a color coding indicates a maintenance of a predetermined value of the vacuum in the vacuum chamber and/or a fluid-tight state of the measuring spring.

11. The diaphragm pressure gauge according to claim 1, wherein a pressure characteristic of the diaphragm pressure gauge is configured substantially with consideration of the characteristic of the measuring spring, of the characteristic of the bellows, and of the value of the vacuum in the vacuum chamber in relation to the area of the measuring spring.

12. The diaphragm pressure gauge according to claim 5, wherein the support arrangement on the side of the measuring spring facing away from the process region is an arrangement with a stepped geometry and/or has an arrangement adapted in shape to the measuring spring.

13. The diaphragm pressure gauge according to claim 1, wherein the vacuum chamber is formed by the measuring spring and a further membrane, which are coupled to one another by a coupling element to transmit a deflection of the measuring spring to the further membrane.

* * * * *